United States Patent

[11] 3,632,154

| [72] | Inventor | Paul F. Woodrich<br>3459 Fairmount Blvd., Cleveland, Ohio 44118 |
|---|---|---|
| [21] | Appl. No. | 50,636 |
| [22] | Filed | June 29, 1970 |
| [45] | Patented | Jan. 4, 1972 |

[54] HEAT-RETAINING PARTITION FOR AUTOMOTIVE VAN
15 Claims, 5 Drawing Figs.

[52] U.S. Cl............................................ 296/24, 98/2.05, 237/28
[51] Int. Cl........................................... B62d 33/06
[50] Field of Search......................... 296/24, 1 R, 31 P; 98/2.05, 2.08; 237/28, 12.3 A, 12.3 B, 12.3 C

[56] References Cited
UNITED STATES PATENTS
3,169,599  2/1965  Johnston ...................... 296/24

*Primary Examiner*—Philip Goodman
*Attorney*—Watts, Hoffmann, Fisher & Heinke

ABSTRACT: An automotive van having a heat-retaining partition disposed to define an operator's compartment within the front portion of the van. The partition includes a wall constructed of a material exhibiting the characteristics of being generally flexible and transparent, and which extends from the ceiling to the floor of the van at a position behind the operator's seat. The partition wall is removably attached to the ceiling and to the floor thereby substantially preventing the transfer of heat into and out of the operator's compartment.

INVENTOR.
PAUL F. WOODRICH
BY
Watts, Hoffmann, Fisher & Heinke
ATTORNEYS

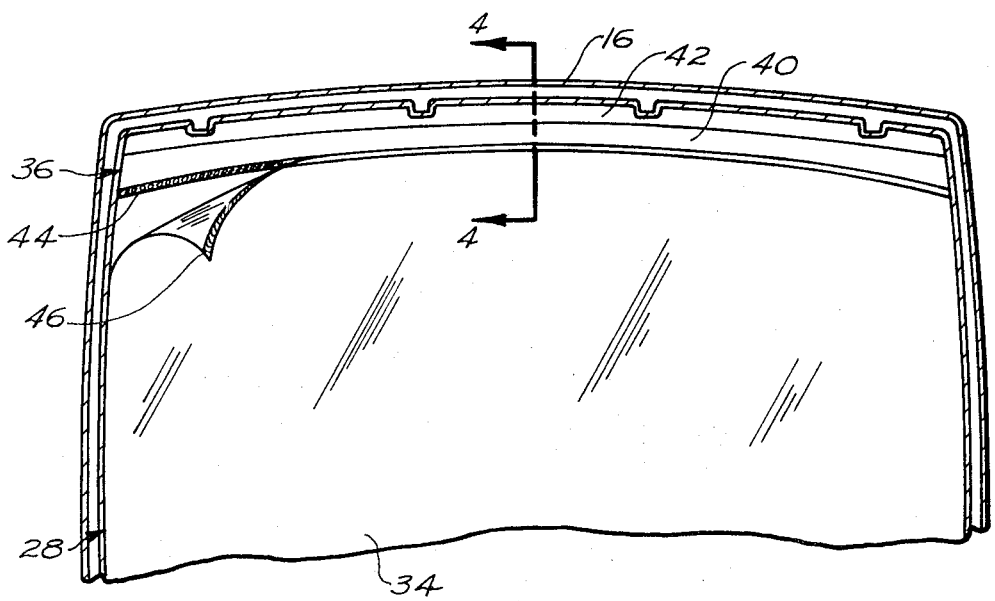
Fig. 3
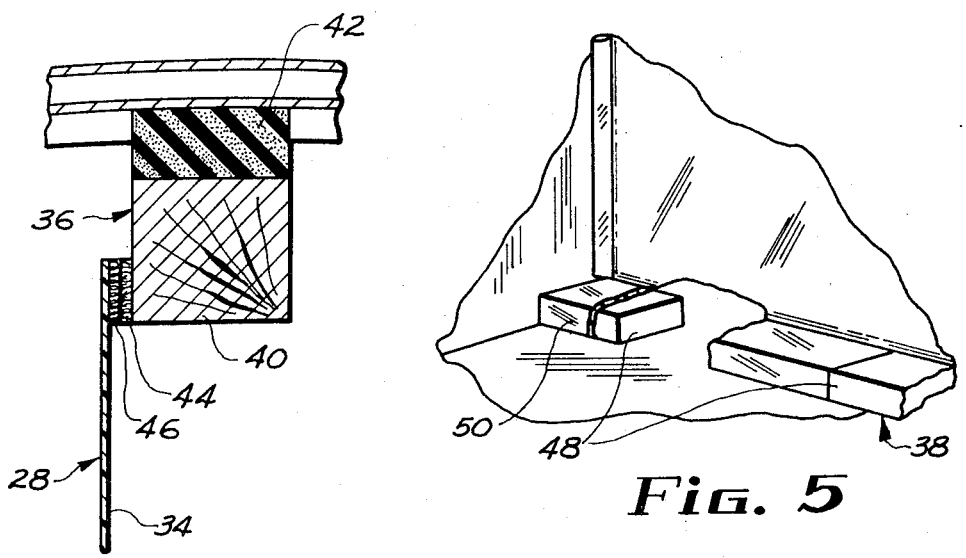
Fig. 4
Fig. 5
INVENTOR.
PAUL F. WOODRICH
BY
Watts, Hoffmann, Fisher & Heinke
ATTORNEYS 3,632,154

HEAT-RETAINING PARTITION FOR AUTOMOTIVE VAN

CROSS-REFERENCED PATENT

U.S. Pat. No. 2,442,821 to W. Menrath, entitled "Draft Eliminator for Vehicles," issued June 8, 1948.

BACKGROUND OF THE INVENTION

This invention pertains to the art of accessories for motor vehicles, and more particularly, to a device for preventing the transfer of heat into and out of an operator's compartment in a van, or other similar vehicle.

Automobiles have included various devices for eliminating undesirable drafts within the vehicle, and have even included protective shields for protecting a driver from cold weather while retaining heat within the vehicle. These devices have generally comprised a plastic shield which extends upward from the back of the driver's seat in a convertible-type vehicle for preventing drafts in the rear portion of the vehicle when the convertible top is lowered. Once such example of a draft eliminator is illustrated in the above-referenced U.S. patent.

In automotive vans it is frequently desirable to heat or cool a portion of the van in which the driver and passengers normally ride. This portion of the van extends from the front of the van to a position behind the driver's seat. The remaining portion, or rear portion, of the van is frequently used to haul various items. Generally, there is no necessity to supply heated air to the rear portion of a van, since passengers seldom ride in that portion of the van. In fact, it may oftentimes be undesirable to supply heat to the rear position of the van.

When the heating unit of a van is operated, heated air is circulated throughout the entire interior of the van. With even the most efficient heating systems, it is difficult if not impossible to adequately heat the air surrounding the driver and passengers because of the large volume of air within the interior of the van. Anyone who has operated an automotive van during the winter months of the year has in all probability experienced this problem.

Another problem associated with the heating of automotive vans is that whenever the rear portion of the van is opened for loading or unloading, there is a complete loss of heated air within the entire van. As is apparent, this loss of heated air within the van causes the driver and passengers to again become chilled.

SUMMARY OF THE INVENTION

The present invention is directed toward a heat-retaining partition for automotive vans, thereby overcoming the noted disadvantages, and others, of such previous vans.

In accordance with one aspect of the present invention there is provided an automotive van having a pair of sidewalls, a front and rear wall, and a top and bottom wall, and having an operator's seat and a heat-exchanging means disposed in a front portion of the van. A heat-retaining partition is disposed to define an operator's compartment within the van. The retaining partition includes a partition wall constructed of a material exhibiting the characteristic of being generally flexible and transparent. In addition, the partition wall extends from substantially the top wall to the bottom wall and from substantially one of the sidewalls to the other sidewall of the van at a position behind the operator's seat for providing a generally airtight operator's compartment. The partition wall is removably attached to the lower portion of the van by a second mounting assembly to thereby substantially prevent the transfer of heat into and out of the compartment.

In accordance with another aspect of the present invention, there is provided an elongated beam member extending from the top wall of the van and being positioned in a direction generally parallel to a plane defined by the partition wall. The first mounting arrangement is disposed between the partition wall and the beam for removably attaching the partition wall to the beam.

In accordance with another aspect of the present invention, there is provided a generally resilient insulating member disposed between the beam member and the top wall of the van to provide a generally airtight seal between the beam and the top wall.

In accordance with another aspect of the present invention, the first mounting arrangement includes a plurality of locking projections each of a generally hook-shaped configuration. The locking projections are mounted on and extend from the beam member. A strip of material which exhibits the characteristic of engaging the locking projection is attached to the partition wall so that when the strip of material is pressed against the locking projections, the partition wall is retained against the beam. An example of this type of mounting arrangement is sold under the name Velcro.

In accordance with another aspect of the present invention, the first mounting arrangement includes a bonding material which exhibits the characteristic of being generally adhesive.

In accordance with still another aspect of the present invention, the second mounting arrangement includes a plurality of retaining devices which are attached to the lower portion of the partition wall. These retaining devices are either of a sufficient weight, or exhibit the characteristic of being magnetic, for retaining the partition wall against the bottom wall of the van.

The primary aspect of the present invention is to provide a partition device for retaining heated air in an operator's compartment of an automotive van.

Another object of the present invention is to provide a removable partition wall which may be disposed within an automotive van for substantially preventing the transfer of heat into or out of driver's compartment.

Another object of the present invention is to provide a heat-retaining partition wall for an automotive van which may be readily removed and stored when not in use.

Another object of the present invention is to provide a heat-retaining partition which is positioned to define an operator's compartment, and which is transparent to allow viewing to the rear of the van.

BRIEF DESCRIPTION OF THE DRAWINGS

These and other objects and advantages of the invention will become apparent from the following description of a preferred embodiment of the invention, as read in conjunction with the accompanying drawings in which:

FIG. 3 is a sectional view of the heat-retaining partition device as illustrated in FIG. 1, taken from a plane extending along the line 3—3 in that figure;

FIG. 4 is a sectional view of the heat-retaining partition device as illustrated in FIG. 3, taken from a plane extending along the line 4—4 in that figure; and, FIG. 5 is an oblique view illustrating in more detail a portion of the heat-retaining partition device as illustrated in FIG. 2.

DESCRIPTION OF THE PREFERRED EMBODIMENT

Figure 1:
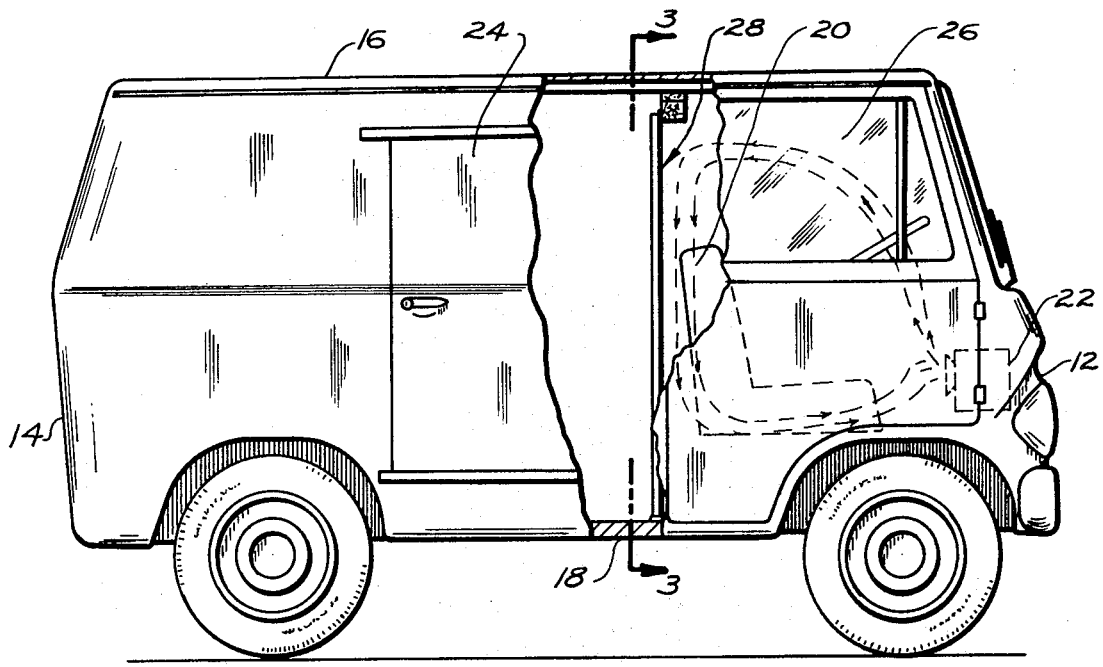
FIG. 1 is a elevational view of an automotive van having a cutaway portion illustrating the heat-retaining partition device of the present invention.
Figure 2:
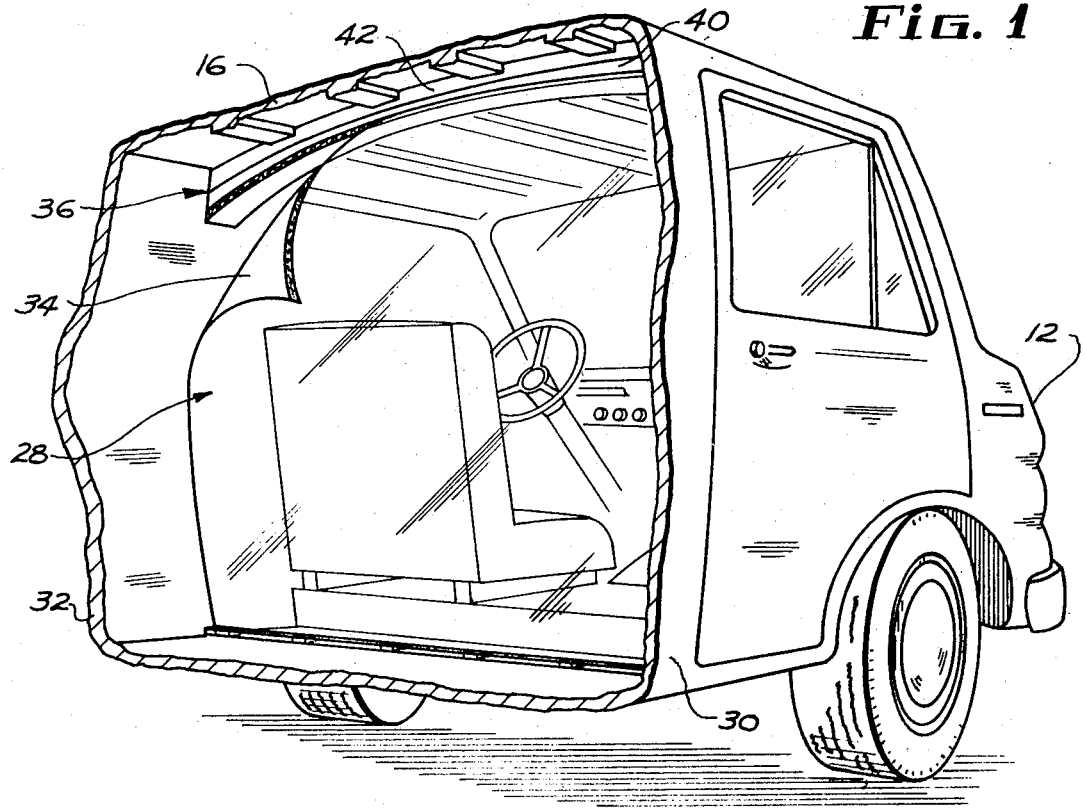
FIG. 2 is an oblique view of the cutaway portion of FIG. 1 illustrating the heat-retaining partition device.

Referring now to the drawings, FIG. 1 generally illustrates an automotive van which is defined by a front wall 12, a rear wall 14, a top wall 16, and a bottom wall 18. Disposed within a front portion of the van is a driver's seat 20 and a heat-exchanging device 22. The heat-exchanging device 22 may take the form of a conventional heater which warms surrounding air by convention currents, a conventional automotive air conditioner, or a combination heating and cooling unit. The van also includes a slidable door 24 for access to the rear portion of the van.

In order to prevent the transfer of heat into and out of a driver's compartment 26, a partition wall 28 is disposed directly behind the driver's seat 20. The partition wall 28 forms a generally airtight seal with the top wall 16, bottom wall 18, and sidewalls 30, 32.

FIGS. 3, 4 and 5 illustrate in more detail the construction of the heat-retaining partition 28 which generally comprises a partition wall 34 supported by a first mounting assembly 36 and a second mounting assembly 38. More particularly, the first mounting assembly 36 includes an elongated and slightly arcuate-shaped beam 40 which extends from one of the sidewalls 30 to the other sidewall 32 at a position in close proximity to the top wall 16 of the van. The elongated beam 40 extends in a direction so as to form generally right angles with the sidewalls 30, 32, and is positioned at a point along the top wall 16 above and slightly behind the driver's seat 20. Disposed between the elongated beam 40 and the top wall 16 is a generally resilient insulating member 42. The insulating member 42 provides an airtight seal between the beam 40 and the top wall 16. In addition, the insulating member 42 makes possible the use of a single universal beam 40 with vans having top walls of various configurations. Thus, the resilient insulating member 42 serves as a filler between the universal beam 40 and the inside surface of the top wall 16.

A strip of Velcro 44 is attached to the side of the beam 40 and extends from one of the sidewalls 30 to the other side wall 32. The Velcro strip 44 includes a plurality of locking projections each of a generally hook-shaped configuration. Disposed along the top edge of the partition wall 34 is a strip of material 46 which, upon being pressed against the Velcro strip 44, engages the projections to thereby support the partition wall 34.

The partition wall 34 is constructed of 16 gauge, clear vinyl material and extends from the beam 40 to the bottom wall 18, and from one of the sidewalls 30 to the other sidewall 32 of the van. The width of the flexible partition wall 34 is slightly greater than the inside width of the van so that the side edges of the partition wall 34 are folded against the sidewalls 30, 32 to form a relatively airtight seal against those walls.

A plurality of magnetic blocks 48 are disposed within a sleeve 50 which extends along the bottom portion of the partition wall 34. The magnetic blocks 48 are magnetically attracted to the metallic bottom wall 18 of the van thereby retaining the lower portion of the partition wall 34 in the desired position.

Thus, the partition wall 34 is positioned to form generally right angles with the sidewalls 30, 32 of the van, is removably attached to the beam 40 by a Velcro bond, and is removably attached to the beam 40 by a Velcro bond, and is removably attached to the bottom wall 18 of the van by the magnetic blocks 48. In order to remove the flexible partition wall 34, the top portion of the wall is pulled away from beam 40 to thereby disengage the Velcro bond, and the magnetic blocks 48 are then lifted away from the metallic bottom wall 18 to thereby release the partition wall 34. The partition wall 34 may then be folded for storage.

Accordingly, when the heat-retaining partition 28 is in the position shown in FIG. 1, the convention currents from the heat-exchanging device 22 are forced to remain within the driver's compartment 26 as illustrated in that figure. The dirver's compartment 26, having a much smaller volume of air than the entire van, is easily heated or cooled by the heat-exchanging device 22. In addition, the heated or cooled air within the driver's compartment 26 is substantially retained when the rear door 24 is opened.

The driver of a vehicle having such a heat-retaining partition may easily view the back portion of the van or may view through the rear window of the van because of the transparent characteristics of the partition wall 34.

Although the invention has been described in conjunction with a preferred embodiment, it is contemplated that various changes in form and parts may be made without departing from the spirit and scope of the invention as defined by the appended claims.

Having thus described my invention, I claim:

1. In an automotive van having a pair of sidewalls, a front and rear wall, and a top and bottom wall, and having an operator's seat and a heat-exchanging means disposed in a front portion of said van; heat-retaining partition means disposed to define an operator's compartment within said van at the front portion of said van and including:

a partition wall constructed of a material exhibiting the characteristics of being generally flexible and transparent, said partition wall extending in a generally vertical plane and positioned to form generally right angles with the side walls of said van;

said partition wall extending from substantially said top wall to said bottom wall and from substantially one of the sidewalls to the other side wall of said van;

first mounting means for attaching said partition wall to an upper portion of said van to thereby generally seal said partition wall to the top wall of said van; and, second mounting means for attaching said partition wall to a lower portion of said van to thereby generally seal said partition wall to the bottom wall of said van in order to substantially prevent the transfer of heat into and out of said compartment.

2. An apparatus as defined in claim 1 including an elongated beam member extending from said top wall of said van and being positioned in a direction generally parallel to a plane defined by said partition wall, and said first mounting means including locking means disposed between said partition wall and said beam for removably attaching said partition wall to said beam.

3. An apparatus as defined in claim 2 including generally resilient insulating means disposed between said beam member and said top wall of said van to provide a generally airtight seal between said beam and said top wall of said van.

4. An apparatus as defined in claim 2 wherein said locking means includes a plurality of locking projections each of a generally hook-shaped configuration, said locking projections being mounted on and extending from said beam member, and means mounted on said partition wall for, upon being pressed against said locking projections, engaging said projections to thereby support said partition wall.

5. An apparatus as defined in claim 4 wherein said locking means exhibits the characteristic of being generally adhesive.

6. An apparatus as defined in claim 4 wherein at least a portion of said engaging means is comprised of a fabric for engaging said locking projections.

7. An apparatus as defined in claim 4 wherein the surface of said engaging means is roughened to engage said locking projections.

8. An apparatus as defined in claim 4 wherein said partition wall is constructed of substantially clear plastic material.

9. An apparatus as defined in claim 7 wherein said second mounting means includes a plurality of retaining devices being attached to a lower portion of said partition wall, said retaining devices being of sufficient weight to substantially seal the partition wall against the bottom wall of said van.

10. An apparatus as defined in claim 7 wherein said second mounting means includes a plurality of magnetic devices being attached to a lower portion of said partition wall for substantially sealing the partition wall against the bottom wall of said van.

11. In an automotive vehicle having a pair of sidewalls, a front and rear wall, a top and a bottom wall defining an enclosure, the front portion of the enclosure having an operator's seat and a heat-exchanging means therein to define an operator's region, the rear portion of the enclosure having a platform therein toe define a load-carrying region, the improvement of a removable heat-retaining partition means disposed between said regions to define an operator's compartment wherein conditioned air from said heat exchanging means is substantially retained, the partition means comprising a partition wall constructed of a material exhibiting the characteristics of being generally flexible and transparent;

said partition wall extending in a generally vertical plane and positioned to form generally right angles with the sidewalls;

said partition wall extending substantially from the top wall to the bottom wall and from one of the sidewalls to the other sidewall; and mounting means to support said partition wall within said vehicle and to maintain the positioning of said partition wall adjacent the sidewalls and the top and bottom walls whereby conditioned air from the heat-exchanging means is substantially retained within the operator's compartment.

12. The apparatus of claim 11 wherein said mounting means includes an elongated beam member extending between said sidewalls at a position in close proximity to the top wall and parallel to said plane of said partition wall, and means for securing said partition wall to said beam member whereby top edge portions of said partition wall are held substantially adjacent the top wall.

13. The apparatus of claim 12 wherein said partition wall and said beam member are connected by hook-shaped projections.

14. The apparatus of claim 11 wherein said partition wall is constructed of substantially clear plastic material.

15. The apparatus of claim 14 wherein said mounting means further includes a plurality of retaining devices disposed along the bottom edge of said partition wall to removably position said bottom edge substantially adjacent the bottom wall.

* * * * *

UNITED STATES PATENT OFFICE
CERTIFICATE OF CORRECTION

Patent No. 3,632,154           Dated January 4, 1972

Inventor(s) Paul F. Woodrich

It is certified that error appears in the above-identified patent and that said Letters Patent are hereby corrected as shown below:

Column 2, line 45, after "is" change "a" to ---an---;
            line 67, change "convention" to ---convection---.

Column 3, lines 43 and 44 are duplicates;
            line 54, change "convention" to ---convection---.

Column 4, line 65, change "toe" to ---to---.

Signed and sealed this 6th day of June 1972.

(SEAL)
Attest:

EDWARD M. FLETCHER, JR.
Attesting Officer

ROBERT GOTTSCHALK
Commissioner of Patents